Dec. 9, 1924.
R. L. FRINK
ART OF DRAWING GLASS
Filed June 12, 1919
1,518,734
3 Sheets-Sheet 3
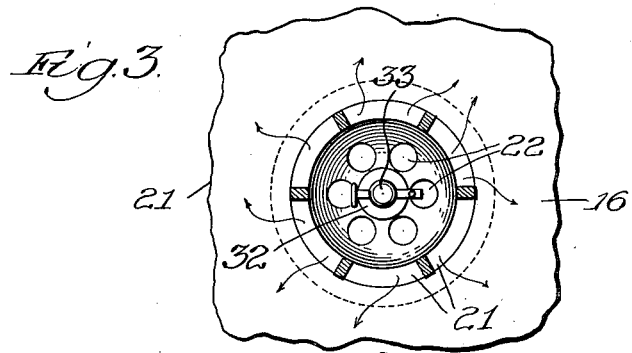
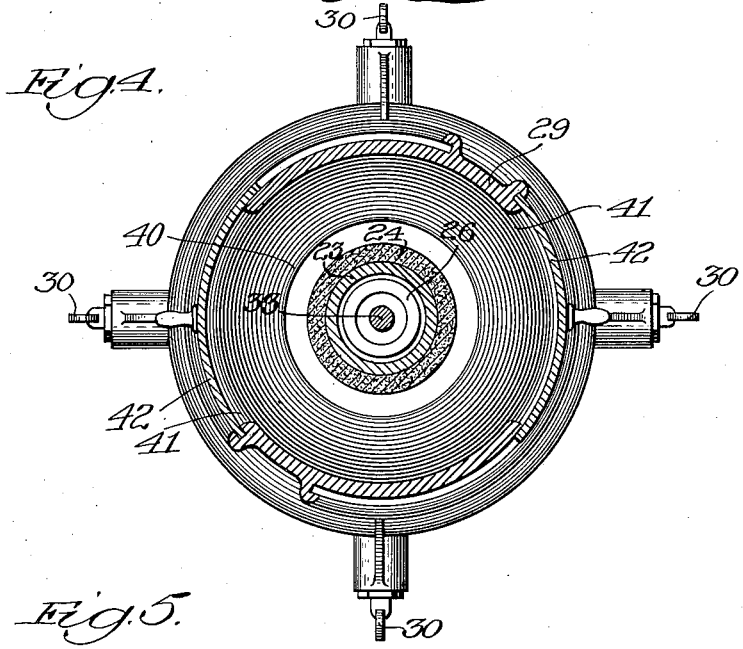
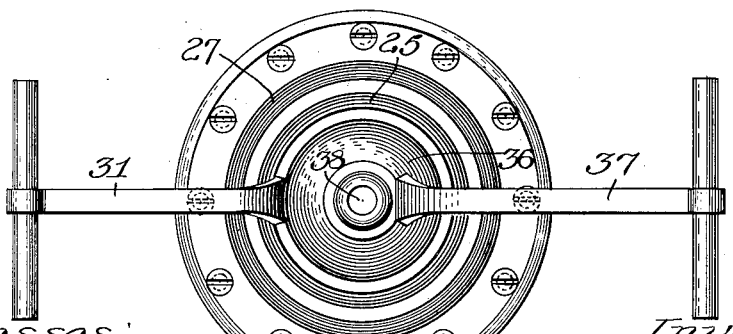
Witnesses:
Inventor:
Robert L. Frink, Patented Dec. 9, 1924.

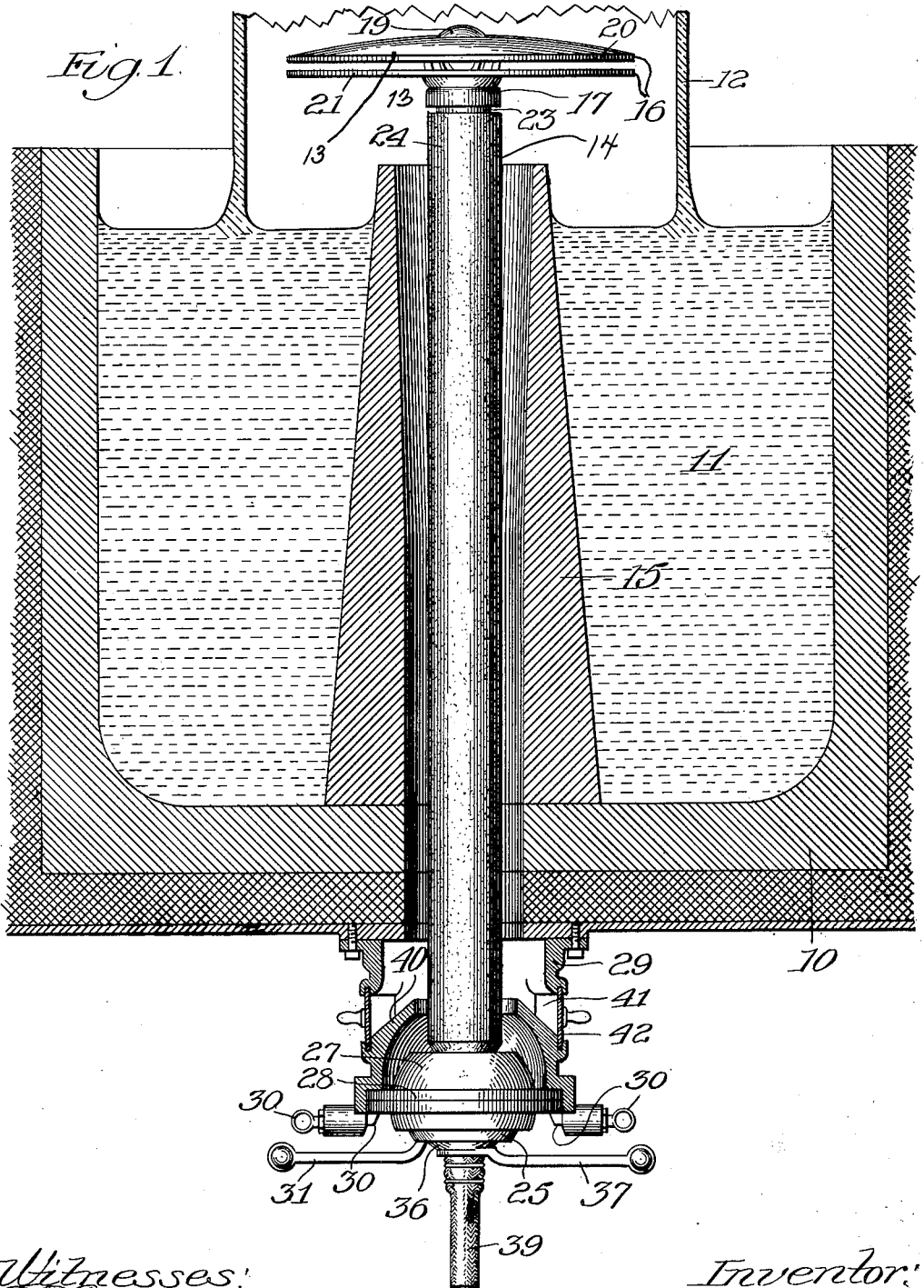

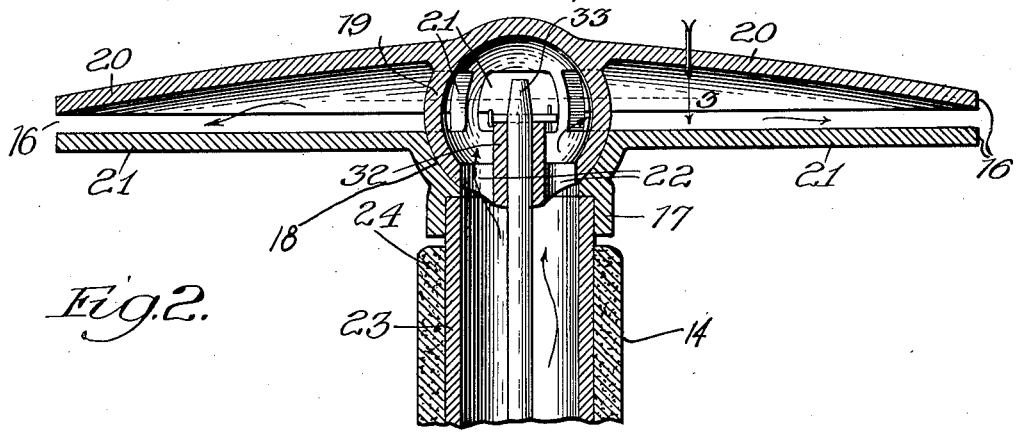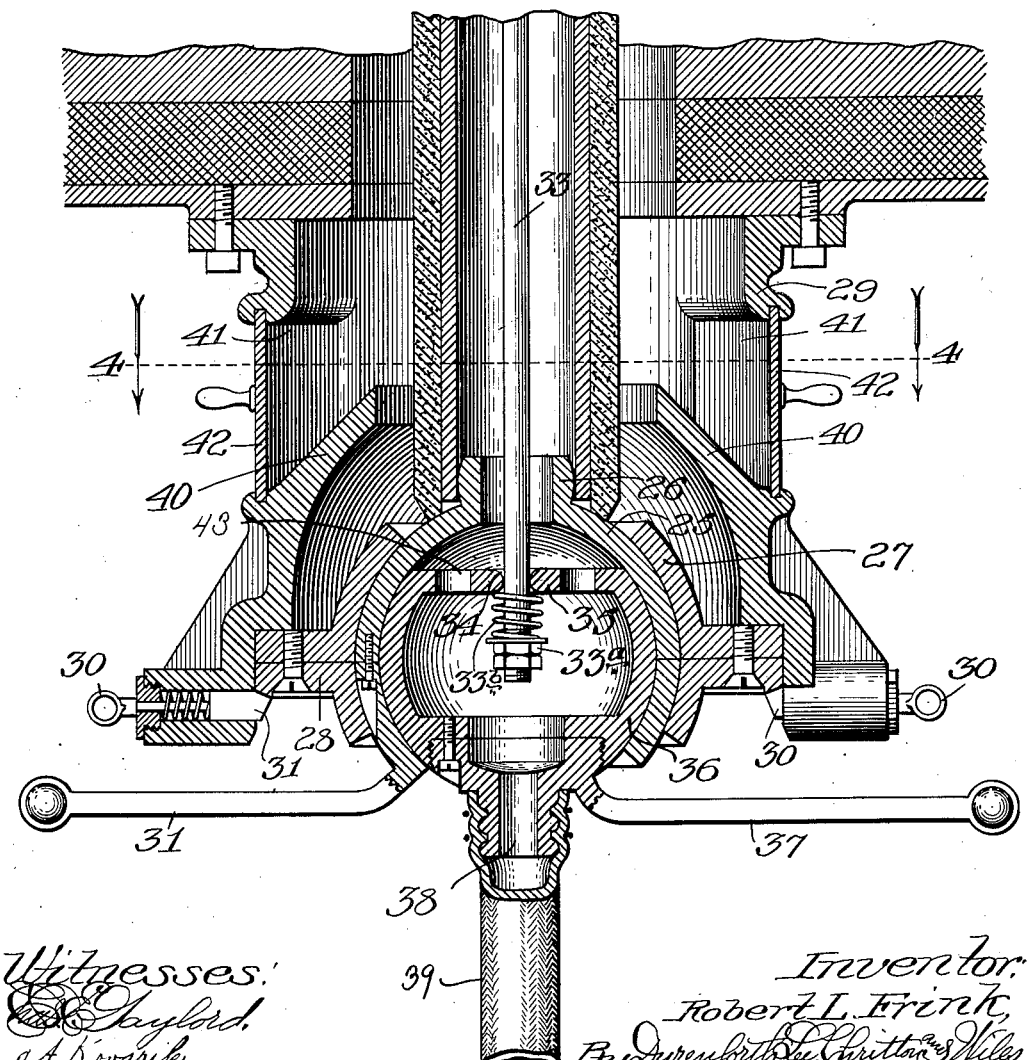

1,518,734

UNITED STATES PATENT OFFICE.

ROBERT L. FRINK, OF LANCASTER, OHIO.

ART OF DRAWING GLASS.

Application filed June 12, 1919. Serial No. 303,804.

*To all whom it may concern:*

Be it known that ROBERT L. FRINK, a citizen of the United States, residing at Lancaster, in the county of Fairfield and State of Ohio, has invented a new and useful Improvement in the Art of Drawing Glass, of which the following is a specification.

My present invention relates to the art of drawing glass, and particularly of drawing hollow glass articles, such as the cylinders from which window glass is made. In the following specification I have set forth a method and apparatus embodying the invention, the same being illustrated by the accompanying drawings, in which:

Fig. 1 is a sectional view of a drawing pot showing the lower portion of a cylinder or other hollow article of glass being drawn therefrom.

Fig. 2 is a broken sectional view of the air-supplying head and of the mechanism associated therewith, the central well and portions of the bath not being shown.

Fig. 3 is a sectional view on line 3—3 of Fig. 2, viewed from above.

Fig. 4 is a sectional view on line 4—4 of Fig. 2, viewed from above, and

Fig. 5 is a bottom view of the supporting mechanism of the air-supplying head.

Heretofore, in drawing hollow glass articles or cylinders from a bath of molten glass or metal by means of a bait or suitable guide mechanism, a substantially static body of air has been maintained in the entire cylinder or the portion thereof adjacent to the metal, air being supplied or withdrawn from this static body in such manner as to maintain the desired pressure conditions therein. In accordance with the present invention, however, a static condition of the air, or any portion thereof, is not purposely maintained, the kinetic effects of a moving current or jet of air being utilized to control and determine the conditions of the drawing process.

To illustrate the method of the present invention, reference may be had to the accompanying drawings, in which numeral 10 indicates a melting or drawing pot containing a body of molten glass 11, the lower portion of the hollow glass body or cylinder being drawn therefrom, being indicated as 12. This cylinder, which may be drawn from the bath in any suitable manner, is preferably open at the top in order to permit free passage of air therefrom.

In order to control the drawing of the glass, the diameter of the cylinder and the thickness and uniformity of its walls, I direct thereagainst at approximately the point of settling or congealing of the glass, a jet or current of air which is preferably contollable as to its volume, direction and force. In the accompanying drawings are illustrated means whereby this may be effected.

An air-supplying head 13, which is more fully hereinafter described, is mounted on a hollow standard 14 which passes through a cylindrical well 15 of refractory material in the drawing pot 10. The head 13 comprises a lower, disk-like member 16 mounted centrally on a hollow supporting tube 23 by means of a bored depending boss 17, a spherical bearing surface 18 being provided in the central opening of the lower head member 16 and the boss 17 for the hollow spherical bearing 19 which is formed centrally of the crowned or dished upper disk 20, and by means of which spherical bearing the upper disk 20 is held spaced from the lower disk 16 and movable thereon. The hollow spherical bearing portion 19 of upper head member 20 is provided with a plurality of slots 21 which open into the space between the two disk members 16 and 20 of the head, and with apertures 22 which open into the interior of the central tube member 23. This supporting tube 23 is fitted within the concentric tube 24 of suitable refractory material or metal. Suitable connections are provided, as hereinafter described, for the supply of air through tube 23 to the head, from which it passes in the form of a circular jet or current.

Suitable means are provided for moving or shifting the position of the entire head 13, the means illustrated in the drawings being as follows:

The end of the head-supporting tubes 23 and 24 are mounted on the hollow spherical member 25, which is provided with a protruding boss 26 extending into central support tube 23, said boss having a central bore permitting the passage of air from within the sphere into the tubular support member 23 and to the head 13. The spherical member 25 is movably retained within the hollow spherical segment 27, which segment is provided with circular flanges 28 which fit into suitable seats in the depending cylindrical support 29 and are retained therein, for example, by spring latches 30. A suitable lever 31, attached to the spherical member 25, enables the latter to be moved into any desired position, thereby shifting or moving the tubular support-members 23 and 24 and with them the head 13 bodily in any desired direction.

In order to protect the head supporting elements from falling particles of glass and the like, an upwardly inclined annular shield 40, of the form of a truncated cone, is supported within the cylindrical support 29 above the spherical member 27. To provide an outlet for air from the lower portion of the cylinder and also to provide access to the upper surface of the shield a plurality of openings 41 may be provided in the support; which may be closed by shutters 42.

In order to vary the force of the jet of air passing out of head 13 in any one direction, the upper member 20 thereof may be moved relatively to the lower member 13 to reduce the exit passage for the air in any given direction in the following manner. The hollow spherical bearing member 19 of the upper head member 20 is provided at substantially its lowermost point with an inwardly projecting bored boss or tube 32, into the opening in which is fitted a rod 33 which extends downwardly through tubular support 23 and through a central opening 34 in the flattened upper portion 35 of the hollow spherical member 36 and the downward movement of which is limited by a pin passing through an opening in the rod and resting on the tubular projection 32. This spherical member is movably fitted within the concentric spherical member 25, and is provided with a lever 37 to effect its movement relative thereto. Spherical members 25 and 36 are each preferably constructed in sections, suitably connected together to permit access to their interiors. To resist upward thrust on the top disk 20 of the head the rod 33 is provided at its lower end below the flattened portion 35 of spherical member 36 with a threaded portion, on which is screwed a nut 33ª which serves as a seat for a coiled spring 33ᵇ interposed between it and the flat portion 35. By movement of the internal sphere 36 the angular position of rod 33 in the tube 23 is correspondingly changed and the top plate 20 of the head 13 is moved relative to the lower member 16, thereby varying the size of the jet opening to any desired extent.

Air is supplied to the head by means of tube 39, which is connected to a nipple 38 formed on the hollow spherical member 36. Suitable openings 43 are provided in the flattened upper portion 35 of this spherical member, through which the air may pass into the tube 23 and to the head 13. It is readily apparent that any suitable means may be utilized for regulating the supply of air and its temperature.

In carrying out the drawing operation a hollow body such as a cylinder is started by means of any suitable device, preferably an open ring bait. The level of the head 13 is such that the jet of air therefrom will impinge upon the walls of the cylinder at about or slightly below the point of setting or congealing of the glass. During uniform and normal drawing of the glass, assuming the absence of conditions affecting the uniformity and regularity thereof, the head will be disposed concentrically within the cylinder, the diameter of which will be such as to provide ample space for the passage of air currents around the head. In such operation the jet opening around the periphery of the head will be uniform, and the kinetic effect or thrust and the cooling effect of the air current will be substantially uniform over the whole of the section of the cylinder against which it impinges, and it will tend to maintain the cylinder substantially uniform in diameter and thickness during the drawing operation.

Varying conditions of temperature within the bath and on its surface, and differences in rate of cooling of the cylinder resulting from external causes tend to produce variations of thickness of the walls of the cylinder and migrations of the base of the cylinder to various portions of the bath. These variations may be compensated and the irregularities produced thereby corrected by correspondingly varying the amount of thrust and cooling effect exerted by the air jet against the walls of the cylinder, which variations may be effected and controlled in the apparatus shown by changing the proportions of the jet opening in the head or by changing the relative position of the head within the cylinder, or both. Thus, if the surface of the bath outside of the cylinder cools to a greater extent on one side of the cylinder, the latter tends to thicken on that side and migrates over the bath in accordance with the varying surface temperatures thereof. This tendency may be counteracted by inclining the entire head in the required direction, thereby exerting a direct thrust upon the cylinder opposite its direction of movement and further producing a varying cooling effect on different portions of the cylinder and bath, thereby regulating the thickness and controlling or counteracting the migrations of the cylinder. Irregularities in thickness of the walls of the cylinder may be corrected by decreasing the force and cooling effect of the jet of air directed against such portions of the cylinder wall in which a thickening is noted. It is likewise apparent that the adjustability of the jet opening in any given direction may be utilized in conjunction with the inclination of the head as a whole to produce any desired kinetic effect or thrust and any desired cooling effect upon the walls of the cylinder.

Although the invention has been described in the preceding specification in considerable detail, it will be clearly understood that such details are not to be regarded as limitations upon the scope and nature of the invention, except in so far as such limitations are included in the following claims.

I claim:

1. The method of producing hollow glass articles which consists in drawing a hollow body from a bath of molten glass, and subjecting the walls of said body to an internally exerted substantial kinetic thrust.

2. The method of producing hollow glass articles which consists in drawing a hollow body from a bath of molten glass and subjecting the walls of said body below the point of setting or congealing thereof to an internally exerted substantial kinetic thrust.

3. The method of producing hollow glass articles which consists in drawing a hollow cylinder from a bath of molten glass and subjecting the walls of said cylinder to an internally exerted substantial kinetic thrust applied around said walls below the point of congealing or setting thereof.

4. The method of producing hollow glass articles which consists in drawing a hollow cylinder from a bath of molten glass, subjecting the walls of said cylinder to an internally exerted substantial kinetic thrust applied around said walls below the point of congealing or setting thereof and controlling the force of said thrust to determine the diameter of the cylinder.

5. The method of producing hollow glass articles which consist in drawing a hollow cylinder from a bath of molten glass and subjecting the walls of said body to an internally exerted substantial kinetic thrust uniformly applied around said walls below the point of congealing or setting thereof, and simultaneously cooling the same.

6. The method of controlling the movements of a hollow glass body while drawing the same from molten glass which consists in exerting a substantial kinetic thrust internally against the walls thereof and varying the force of said thrust exerted against different portions of said walls.

7. In apparatus for drawing glass articles, a head having an annular peripheral jet opening, means for supplying air thereto, and means for varying the size of said opening at various portions thereof.

8. In apparatus for drawing hollow glass articles, a head adapted to extend within the article being drawn and to direct a fluid jet against the sides thereof, and means for varying the position of said head relative to the walls of said article.

9. In apparatus for drawing hollow glass articles, a head adapted to extend within the article being drawn, said head comprising spaced upper and lower plates, means for supplying air between said plates, and means for varying the relative position of said plates to each other.

10. An apparatus for drawing glass articles, a head adapted to extend within the article being drawn, said head comprising a lower plate, an upper plate spaced therefrom and supported centrally thereupon, means for varying the angular position of the upper plate relative to the lower plate, and means for supplying air between said plates.

11. In apparatus for drawing hollow glass articles, a head adapted to extend within the articles, said head comprising spaced plate members, a tubular support communicating with the space between said plate members and means for varying the inclination of said support.

12. In apparatus for drawing hollow glass articles, a head adapted to extend within the article being drawn, a support for said head, means for varying the inclination of said support and means for supplying air to said head.

13. In apparatus for drawing hollow glass articles, a head adapted to extend within the article being drawn, said head comprising a lower plate member having a central spherical bearing surface, an upper plate member having a central spherical bearing movably fitted in said spherical bearing surface, said spherical bearing spacing the upper plate from the lower plate and being provided with openings whereby air may be admitted between the plates.

14. In apparatus for drawing hollow glass articles, a head adapted to extend within the article being drawn, said head comprising a lower plate member having a central spherical bearing, an upper plate having a central spherical bearing movably fitted in said spherical bearing surface, said spherical bearing spacing the upper plate from the lower plate and being provided with openings whereby air may be admitted between the plates, and means for moving the spherical bearing of the upper plate within the bearing surface of the lower plate and thereby vary the inclination of the upper plate with respect to the lower plate.

15. In apparatus for drawing hollow glass articles, a bath provided with a central well, a head above said well, a tube extending downwardly through said well and supporting the head, a cylindrical support attached to the bath below the well, supporting means within the cylindrical support for the tube and a shield within the cylindrical support above the supporting means to protect the latter.

16. In apparatus for drawing hollow glass articles, a bath provided with a central well, a head above said well, means for drawing a hollow body to surround said head, a support for said head extending downwardly through said well and spaced therefrom, supporting means for said support adapted to close the bottom of the well, said last mentioned supporting means being provided with openings, means for closing said openings and means for supplying air to the head.

In witness whereof I have hereunto set my hand and seal this 12 day of April, 1919.

ROBERT L. FRINK. [L. S.]